United States Patent [19]
Mizuno et al.

[11] Patent Number: 5,331,147
[45] Date of Patent: Jul. 19, 1994

[54] SCANNING OPTICAL APPARATUS HAVING AT LEAST ONE DIVISION SENSOR

[75] Inventors: Toshiyuki Mizuno, Yokohama; Yoshinobu Shiraiwa, Machida, both of Japan

[73] Assignee: Canon Kabushiki Kaisha, Tokyo, Japan

[21] Appl. No.: 935,386

[22] Filed: Aug. 26, 1992

[30] Foreign Application Priority Data

Aug. 30, 1991 [JP] Japan .................................. 3-220007

[51] Int. Cl.$^5$ .............................................. H01J 40/14
[52] U.S. Cl. ..................................... 250/208.2; 250/235; 358/494
[58] Field of Search ................... 250/208.2, 235, 236; 358/494, 481

[56] References Cited

U.S. PATENT DOCUMENTS

4,203,672  5/1980  Smith, Jr. .......................... 250/235
4,990,771  2/1991  Minoura et al. .................. 250/236

Primary Examiner—Edward P. Westin
Assistant Examiner—T. Davenport
Attorney, Agent, or Firm—Fitzpatrick, Cella, Harper & Scinto

[57] ABSTRACT

A scanning optical apparatus is provided with a light source, a scanning device and a detector. A light beam generated from the light source is deflected by the scanning device to be scanned on a surface to be scanned. The light beam scanning on the surface to be scanned is detected by the detector. The detector is constructed such that three or more photosensors are closely arranged adjacent one another in the scanning direction. At least one of the photosensors is a division sensor which is arranged symmetrically with respect to the scanning direction.

23 Claims, 7 Drawing Sheets

SCANNING OPTICAL APPARATUS HAVING AT LEAST ONE DIVISION SENSOR

BACKGROUND OF THE INVENTION

1. Field of the Invention

The invention relates to a light beam scanning apparatus to scan a scanning object by a light beam in order to record or read an image or the like and, more particularly, to a light beam detecting mechanism in which when a predetermined position serving as a positioning reference point is scanned by a light beam, such a scan is detected and a predetermined signal is generated.

2. Related Background Art

Figure 1:
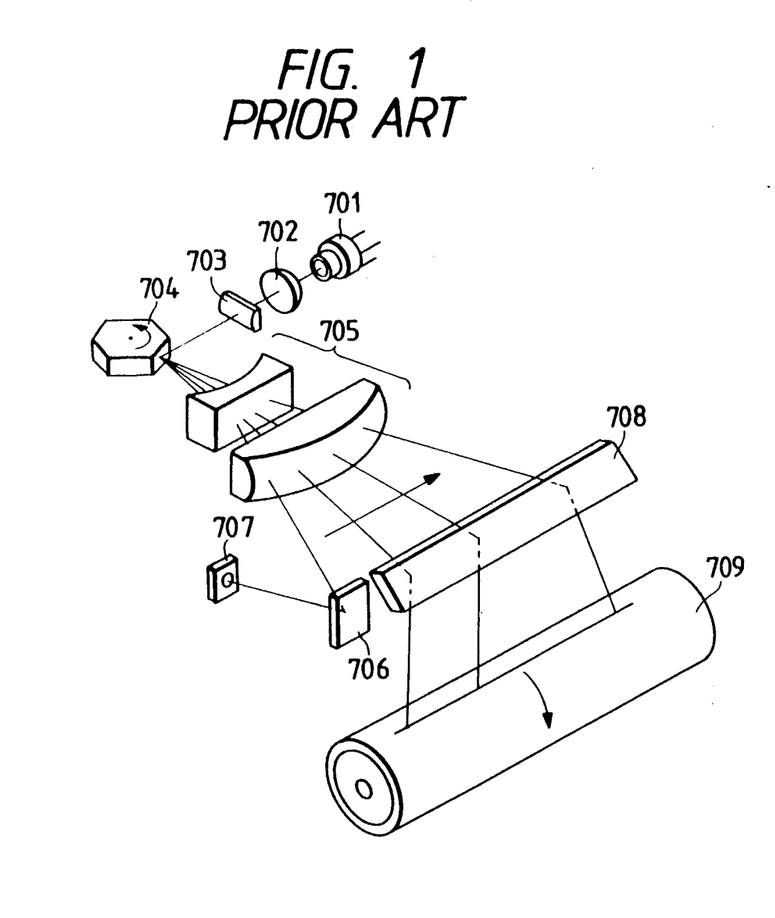
FIG. 1 is a diagram showing a construction of a prior art of a laser printer.

FIG. 1 is a schematic diagram showing the construction of a conventional example of a laser printer in which a light beam scanning apparatus is assembled.

The light scan in the laser printer which is used to record an image or the like is executed in the following manner.

A laser beam which is emitted from a semiconductor laser 701 passes through a collimating lens 702, a cylindrical lens 703, and the like and enters a rotational polygon mirror 704 which is rotated at a predetermined speed. The laser beam is reflected by each surface of the polygon mirror 704, thereby deflecting and scanning within a predetermined angle. After that, the reflected light passes through the optical system such as fθ lens group 705, light path folding mirror 708, and the like which are provided to form the beam and to scan at a uniform speed. The light subsequently optically scans a photo sensitive material 709 as a recording medium.

The light scan, printing operation, and the like as mentioned above are executed by a control unit (not shown).

The control unit drives the semiconductor laser 701 by an on/off signal based on an image signal which is supplied from the outside. The laser beam is modulated in accordance with the image signal. The drum-shaped photo sensitive material 709 is rotated in the direction perpendicular to the main scanning direction every main scan. The optical recording operation of an image, characters, or the like is finished by the actuation of the semiconductor laser 701 and the rotation of the photo sensitive material 709.

In order to prevent adverse influence on the image to be formed, the positional precision of the laser scan relative to the image signal needs to be held to an extreme high precision to avoid a variation in the position precision of each main scan. For this purpose, in such a kind of laser printer or the like, there is provided a light beam detecting mechanism having a light beam receiving section 707 for receiving the light folded by a sub-mirror 706 as shown in the diagram and for detecting that the laser beam which had been deflected and scanned by the rotational polygon mirror 704 has reached a predetermined position. The light beam detecting mechanism generates a sync signal to decide the recording starting position on the photo sensitive material 709 on the basis of a detection signal of the light beam receiving section 707. The control unit allows the image signal to be generated in accordance with the timing of the sync signal, thereby always keeping the same writing position.

The laser beam of a predetermined intensity is not always irradiated to the light beam receiving section 707 due to a surface accuracy or a surface inclination of each surface of the rotary polygon mirror, dust, or dirt of the rotary polygon mirror or the optical system, or the like. Therefore, if the apparatus is constructed so as to generate the sync signal when the level of output of the light receiving section exceeds a predetermined threshold value, a variation of the light amount occurs every main scan. If the level of output which is received by the light beam detecting mechanism fluctuates, the generation timing of the sync signal is deviated.

To prevent the above inconveniences, there has been proposed a method whereby two light receiving sections (the first light receiving section and the second light receiving section) are closely arranged on the main scan line, a ratio of output signals of the first and second light receiving sections is obtained by a calculating circuit, and the sync signal is generated when the output signal ratio is equal to a predetermined value.

On the other hand, as for the semiconductor laser, since the output characteristics are easily influenced by a temperature change and a fluctuation of the light amount is large, a method whereby the semiconductor laser device is devised so as to keep a predetermined temperature by a Peltier device or the like and the output fluctuation is suppressed has been proposed.

In the above conventional light beam detecting mechanisms, in case of the light beam detecting mechanism having only one light receiving section, there is a problem such that the generation timing of the sync signal is deviated due to the output fluctuation of the light beam.

In case of the light beam detecting mechanism having two light receiving sections, since the sync signal is obtained by setting off the output fluctuation of the light beams which are irradiated to the light receiving sections, the above problem does not occur. However, there is a problem such that an out-of focus state of the light beam, out-of main scanning position, or the like due to the precision of the whole apparatus by a temperature change, an aging change, or the like cannot be detected.

In case of suppressing the output fluctuation of the semiconductor laser device so as to keep a predetermined temperature by a Peltier device or the like, the generation timing of the sync signal is not deviated. However, since the output characteristics of the semiconductor laser device are also changed by a change with the passage of time, there is a case where a wavelength fluctuation occurs and the laser beam of a wavelength which is different from the initial set wavelength is generated. When the wavelength fluctuates, an out-of focus state generally occurs in the laser scan optical system or the like in which the chromatic aberration is not sufficiently corrected. Any one of the above light beam detecting mechanisms cannot cope with such an out-of focus state.

In many cases, the user is aware of such various inconveniences as mentioned above until after completion of recording, so that both time and costs are wasted.

SUMMARY OF THE INVENTION

The invention is made in consideration of the problems of the conventional techniques as mentioned above and it is an object of the invention to realize a light beam detecting mechanism which can generate a sync signal at a proper timing irrespective of an output fluctuation of a light beam and can also detect an out-of focus of the light beam, a main scanning position deviation, or the like due to a change with the passage of time of the apparatus and semiconductor laser device.

According to a light beam detecting mechanism in a scanning optical apparatus of the invention, there is provided a light beam detecting mechanism in which when a light beam scans a predetermined position as a reference point for positioning in a light beam scanning apparatus for scanning an object to be scanned by the light beam, such a scan is detected and a predetermined signal is generated, wherein the light beam detecting mechanism has three or more photosensors which are symmetrically arranged in the scanning direction of the light beam, while a straight line which passes through the reference point and is perpendicular to the scanning direction is used as an axial center, and division sensors which are symmetrically arranged with respect to the scanning direction of the light beam are used as at least one of the three photosensors.

The light beam detecting mechanism of the invention generates a main scanning position deviation signal indicating that the scanning position of the light beam has been deviated when a difference between the outputs of the division sensors which are symmetrical with respect to the scanning direction of the light beam exceeds a first predetermined value.

In this case, a laser intensity signal indicating that an intensity of light beam is sufficiently large can be also generated when the sum of the outputs of the division sensors which are symmetrical with respect to the scanning direction of the light beam exceeds a second predetermined value.

On the other hand, when the outputs of two photosensors which construct one pair and are arranged at the symmetrical positions on both sides of the symmetrical axis (dividing line of the sensors) are equal and a ratio between the sum of the outputs of the pair of two photosensors and the sum of the outputs of another pair of two photosensors if such another pair of photosensors exist, and/or if another photosensor is provided at the center, a ratio of the sum of the outputs of the pair of two photosensors and the output of such a central photosensor exceeds a predetermined value corresponding to a third predetermined ratio, the out-of-focus signal indicating that a focal point of the light beam is deviated can be also generated.

Further, when the outputs of two photosensors which construct one pair and are arranged at the symmetrical positions on both sides of the symmetrical axis (dividing line of the sensors) are equal and the outputs of two photosensors which construct another pair if such another pair of two photosensors exist are equal and the sum of the outputs of those photosensors exceeds a fourth predetermined value, and/or if another photosensor is provided at the center, when the output of such a central photosensor exceeds a fourth predetermined value corresponding to such an output, the sync signal indicating that the light beam has scanned a predetermined position as a reference point for positioning can be also generated.

According to the light beam detecting mechanism with the above construction, since the independent output signal is derived from each photosensor, the out-of-focus state of the light beam is detected by obtaining a ratio between the sum of the outputs of the pair of two photosensors locating at a pair of symmetrical positions with respect to the symmetrical axis (dividing line of the sensors) of three or more photosensors which are arranged in the scanning direction of the light beam as a center and the sum of the outputs of another pair of photosensors if such another pair of photosensors exist and/or by obtaining the ratio between the sum of the outputs of such a pair of two symmetrical photosensors and the output of another photosensor if such another photosensor exists on the symmetrical axis. Further, when the outputs of a pair of two photosensors locating at the symmetrical positions on both sides of the symmetrical axis are equal, if another photosensor exists on the symmetrical axis, the sync signal can be also generated from the output value of such another photosensor and/or if another pair of photosensors exist, when the outputs of such another pair of photosensors are equal, the sync signal indicating that the light beam has scanned a predetermined position serving as a reference point for positioning can be generated from the sum of the output values.

A deviation of the scanning position of the light beam can be detected from the ratio of the outputs of the division sensors which are symmetrical with respect to the scanning direction of the light beam. By obtaining the sum of the outputs of the division sensors, an intensity signal of the laser beam is obtained.

Since each of the above signals is generated in consideration of an output fluctuation of the light beam, an adverse influence on the image on the scanning object, a reading error, or the like is prevented.

DETAILED DESCRIPTION OF THE PREFERRED EMBODIMENTS

Embodiments of the invention will be described hereinbelow with reference to the drawings.

Figure 2:
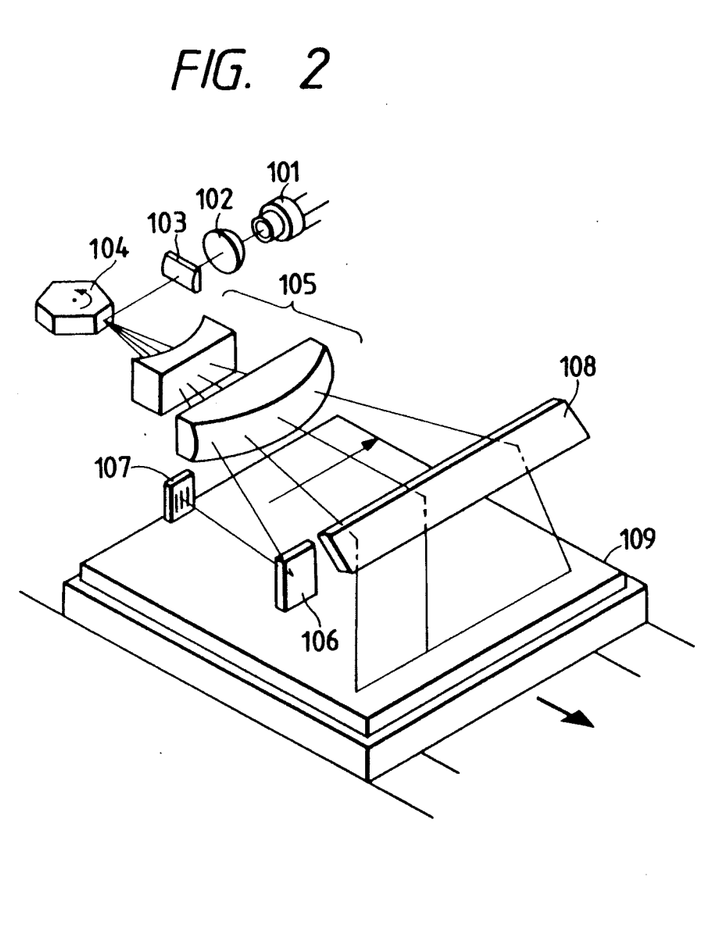
FIG. 2 is a diagram showing a construction of a laser printer having the first embodiment of the invention.

FIG. 2 is a diagram showing a construction of a laser printer of the flat bed type having a light beam detecting mechanism according to the first embodiment of the invention.

In the diagram, a semiconductor laser 101, a collimating lens 102, a cylindrical lens 103, a rotational polygon mirror 104, an fθ lens group 105, a submirror 106, a light path folding mirror 108, and a control unit (not shown) to control the operations of those component parts are similar to the semiconductor laser 701, collimating lens 702, cylindrical lens 703, rotational polygon mirror 704, fθ lens group 705, submirror 706, light path folding mirror 708, and control unit shown and described in FIG. 1. Therefore, their descriptions are omitted here.

In the prior art shown in FIG. 1, the scan in the sub scanning direction is executed by rotating the drum-shaped photo sensitive material. In the embodiment, however, the subscan is executed by putting a plate-shaped photo sensitive material 109 as a recording medium onto a rectilinear moving table and moving the photo sensitive material 109 and the optical recording is executed. Prior to recording, the light beam to perform the optical recording is reflected by the submirror 106 and reaches a light beam receiving section 107 serving as one of the light beam detecting mechanisms arranged at the position which is optically conjugate to the photo sensitive material 109. Photodiodes having a division structure are used in the light beam receiving section 107.

Figure 3A:
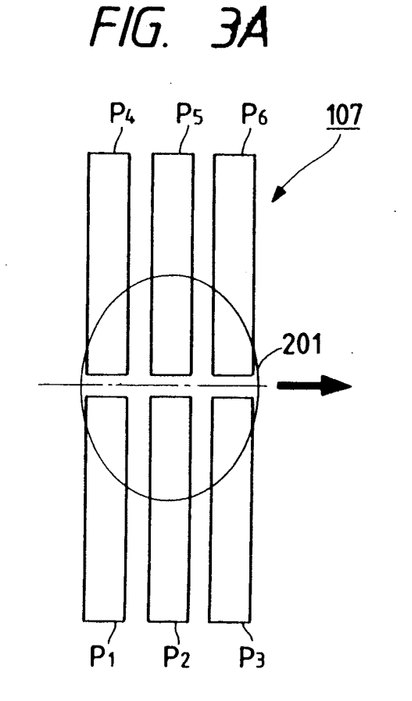
FIG. 3A is a diagram showing the shape of a light beam receiving section 107 in FIG. 2.
Figure 3B:
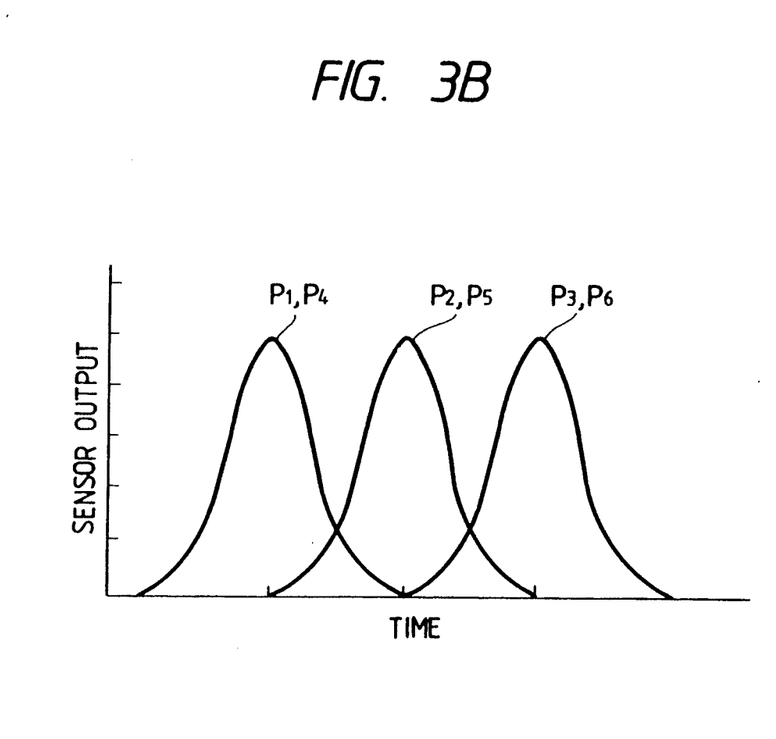
FIG. 3B is a diagram showing light receiving characteristics of the light beam receiving section 107.

FIG. 3A is a diagram showing the shape of light beam receiving section 107. FIG. 3B is a diagram showing the light receiving characteristics of the light beam receiving section 107.

The light beam receiving section 107 is constructed by six photodiodes $P_1$ to $P_6$ as shown in the diagram. Every three photodiodes are symmetrically arranged in parallel so as to face each other around the center of a main scan line shown by an arrow. Three division sensors (photosensors) are symmetrically arranged with respect to the scanning direction of the light beam.

A total width of light beam receiving section 107 with regard to the main scanning direction is set to a small value in order to make the leading and trailing edges for detection sharp and is set to about a diameter that is defined by $1/e^2$ of the central intensity of the laser beam. Detection signals of the photodiodes $P_1$ to $P_6$ are supplied to a processing circuit group (not shown) constructing the light beam detecting mechanism. Each of the detection signals supplied to the processing circuit group is amplified through an amplifier. After that, the amplified signals are supplied to an arithmetic operating circuit to execute electrical signal processes. In the arithmetic operating circuit, a sync signal indicating that the light beam has passed a reference point as a fundamental point for recording is generated. Further, a laser intensity signal indicating that the intensity of light beam is enough large, an out-of focus signal indicating that the focal point is deviated, a main scanning position deviation signal indicating that the scanning position of the light beam is deviated, and the like are generated as necessary.

Thus, an adverse influence on the image on an object to be scanned, a reading error, or the like can be prevented and time and costs can be reduced.

The light receiving sections arranged as mentioned above will now be described with reference to FIGS. 3A to 5B with respect to the relations between the scanning times of the photodiodes $P_1$ to $P_6$ and the outputs when the beam of an intensity distribution which is approximate to the general Gaussian distribution passes in case of the beam which is used in the laser scanning system.

When the passing position of the beam is located on the main scan line, in other words, when the beam passes the center of the light receiving section as shown in FIG. 3A, the outputs of the photodiodes which are symmetrical with respect to the center of the main scan line are equal. As shown in FIG. 3B, a time difference occurs every set (FIG. 3B shows a graph on the assumption that all of the output characteristics of the photodiodes are equal. The same shall also apply hereinbelow.).

Figure 4A:
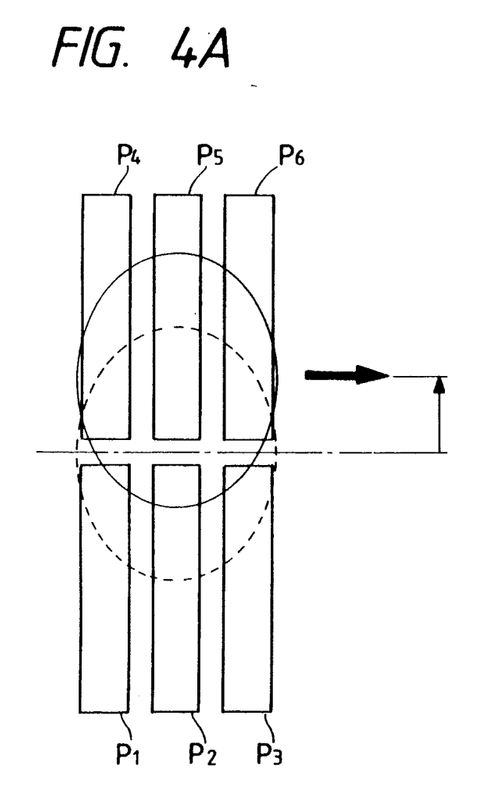
FIG. 4A is a diagram showing a light reception state of the light beam receiving section 107 in FIG. 2 in the case where a main scanning position is deviated from the inherent position.
Figure 4B:
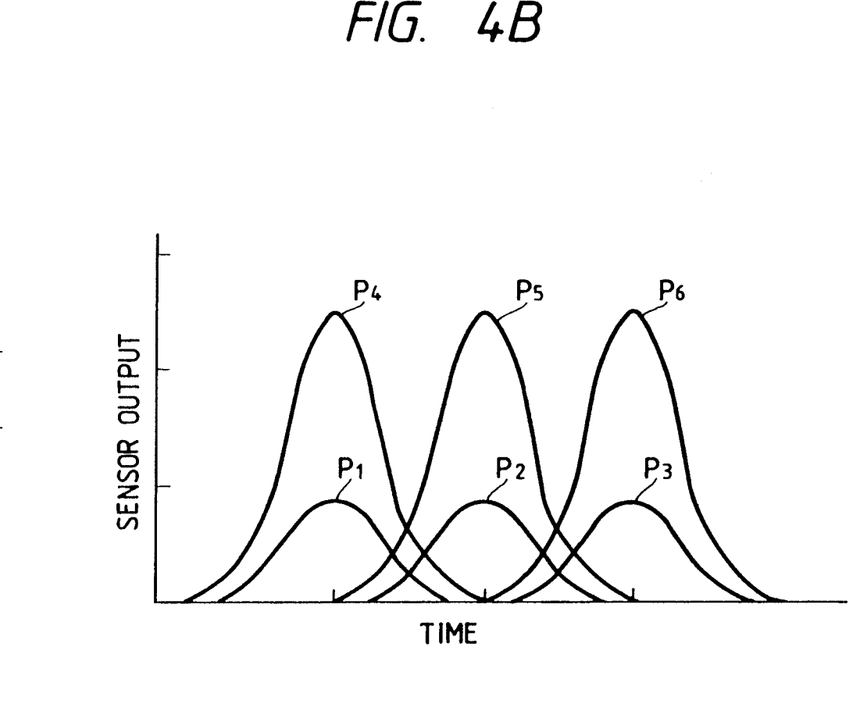
FIG. 4B is a diagram showing light receiving characteristics in FIG. 4A.
Figure 5A:
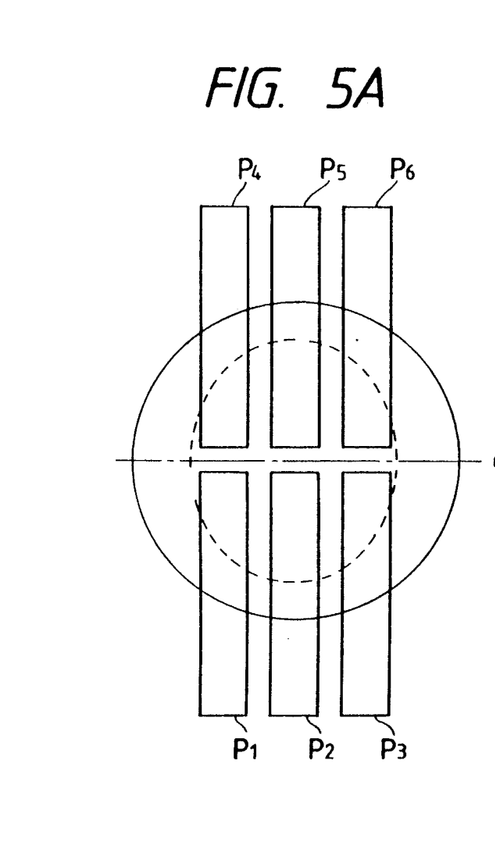
FIG. 5A is a diagram showing a light reception state of the light beam receiving section 107 in FIG. 2 in the case where an out-of focal position occurs.
Figure 5B:
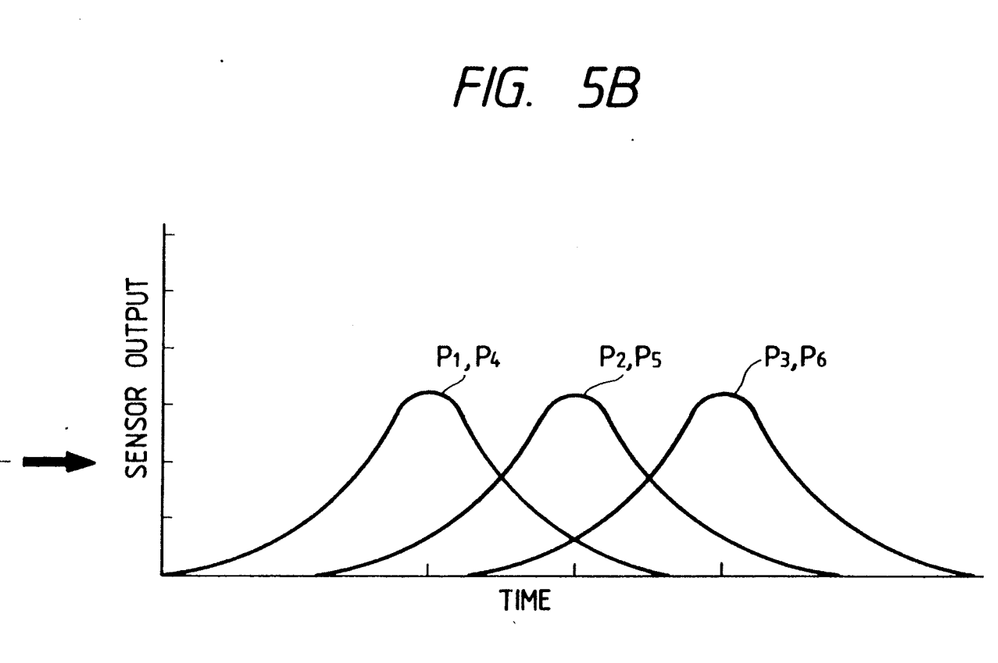
FIG. 5B is a diagram showing light receiving characteristics in FIG. 5A.

On the other hand, when the main scan line is deviated from the inherent position as shown in FIG. 4A, a difference occurs in the outputs of the photodiodes which are symmetrical with respect to the center of the main scan line and the output characteristics change as shown in FIG. 4B. Further, when an out-of focal point position occurs as shown in FIG. 5A, the leading characteristics of the output of each photodiode becomes gentle as shown in FIG. 5B.

Various kinds of signals which are generated in the embodiment will now be described.

In any of FIGS. 3A to 5B, as for the generation timing of the sync signal, the time point when the center of the light beam is located in the photodiodes $P_2$ and $P_5$ and the trailing edge of each output of the photodiodes $P_1$ and $P_4$ and the leading edge of each output of the photodiodes $P_3$ and $P_6$ intersect is used as a reference. Since the light beam has an intensity distribution which is approximate to the Gaussian distribution, when the focal position is normal, the synthesized output of the photodiodes $P_2$ and $P_5$ is higher than the synthesized output of the photodiodes $P_1$ and $P_4$ or the synthesized output of the photodiodes $P_3$ and $P_6$ by a predetermined ratio.

The sync signal is generated at the above generation timing, namely, it is generated when the ratio between the synthesized output of the photodiodes $P_2$ and $P_5$ and the synthesized output of the photodiodes $P_1$ and $P_4$ (or synthesized output of the photodiodes $P_3$ and $P_6$) is equal to or larger than a predetermined value. When this output level ratio is smaller than the predetermined value, it is determined that since the out-of focal position as shown in FIG. 5 has occurred, the Gaussian distribution is widened and the output peak is low. Therefore, an out-of focus (focal point is deviated) signal is generated and the generation of the sync signal is cancelled (cancelling circuit is not shown).

When the main scanning position is deviated to either the upper or lower position from the inherent position as mentioned above, a difference occurs between the outputs of the photodiodes which are symmetrical with respect to the main scan line as a center as shown in FIG. 4B. In the embodiment, the absolute value of the difference between the outputs of the photodiodes $P_1$ and $P_4$ which are symmetrical with respect to the main scan line as a center is obtained and compared with a predetermined value, thereby detecting the deviation of the main scanning position. In this case, as will be obviously understood from the diagram, the deviation of the main scanning position can be also similarly detected by obtaining the difference between the outputs of the photodiodes $P_2$ and $P_5$, or the difference between the outputs of the photodiodes $P_3$ and $P_6$, or the difference between the sum of the outputs of the photodiodes $P_1$, $P_2$, and $P_3$ and the sum of the outputs of the photodiodes $P_4$, $P_5$, and $P_6$.

The arithmetic operating circuit which is used in the embodiment will now be described with reference to FIG. 6.

Figure 6:
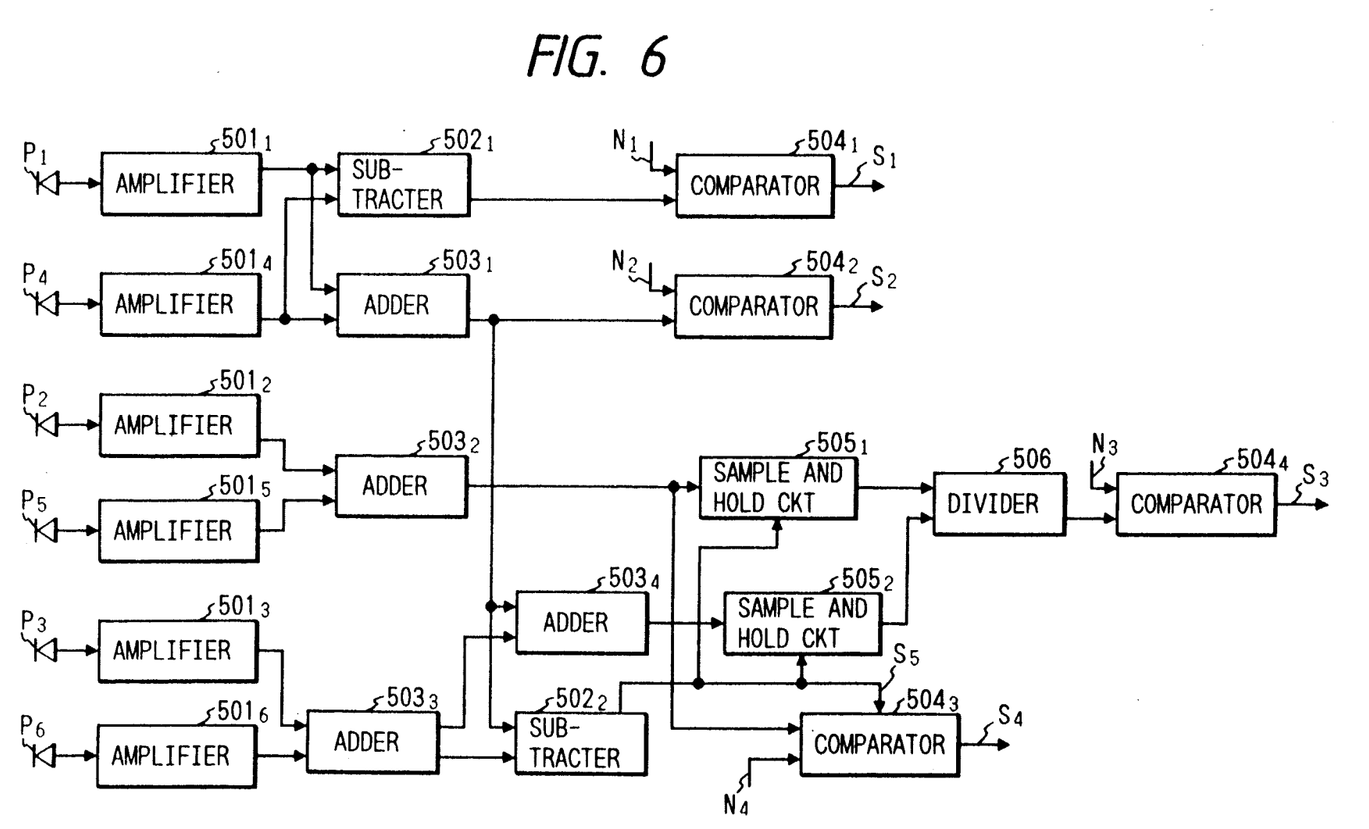
FIG. 6 is a block diagram showing a construction of an arithmetic operating circuit which is used in the first embodiment.

FIG. 6 is a block diagram showing a construction of the arithmetic operating circuit to execute the signal processes as mentioned above from the outputs of the photodiodes.

Amplifiers $501_1$ to $501_6$ are respectively individually provided for the photodiodes $P_1$ to $P_6$. The outputs of the photodiodes $P_1$ to $P_6$ are signal processed after they were amplified by the amplifiers $501_1$ to $501_6$, respectively.

Outputs of the amplifiers $501_1$ and $501_4$ are supplied to a subtracter $502_1$ and an adder $503_1$, respectively. An output indicative of the result of the subtraction of the subtracter $502_1$ is supplied to a comparator $504_1$ and compared with a predetermined value $N_1$. The comparator $504_1$ generates a main scanning position deviation signal $S_1$ indicative of the deviation of the main scanning position in accordance with the result of the comparison.

An output indicative of the result of the addition of the adder $503_1$ is supplied to a comparator $504_2$ and compared with a predetermined value $N_2$. The comparator $504_2$ generates a laser intensity signal $S_2$ indicating that the intensity of laser beam is equal to or larger than a predetermined value in accordance with the result of the comparison.

Outputs of the amplifiers $501_2$ and $501_5$ are supplied to an adder $503_2$ and added. After that, an output of the adder $503_2$ is supplied to a sample and hold circuit $505_1$ and a comparator $504_3$. Outputs of the amplifiers $501_3$ and $501_6$ are supplied to an adder $503_3$ and added. After that, an output of the adder $503_3$ is supplied to an adder $503_4$ and a subtracter $502_2$. The output signal of the result of the addition by the adder $503_3$ and the output signal of the result of the addition by the adder $503_1$ are supplied to each of the adder $503_4$ and subtracter $502_2$. The signal indicative of the result of the addition of the adder $503_2$ is supplied to the sample and hold circuit $505_1$ and comparator $504_3$. The signal indicative of the result of the addition of the adder $503_4$ is supplied to a sample and hold circuit $505_2$. The output signals indicative of the results of the additions of the adders $503_1$ and $503_3$ are supplied to the subtracter $502_2$. When the values of those addition outputs are equal, the subtracter $502_2$ supplies an output holding signal $S_5$ to the sample and hold circuits $505_1$ and $505_2$ and the comparator $504_3$. The output signals of the sample and hold circuits $505_1$ and $505_2$ are supplied to a divider $506$. A ratio of those output signals is sent to a comparator $504_4$. The comparator $504_4$ compares the input ratio and a predetermined value $N_3$ and generates an out-of focus signal $S_3$ in accordance with the result of the comparison.

The comparator $504_3$ receives the output signal indicative of the result of the addition of the adder $503_2$ and a predetermined value $N_4$ and compares them and generates a sync signal $S_4$ in accordance with the result of the comparison.

The operation of the arithmetic operating circuit will now be described.

The outputs of the photodiodes $P_1$ and $P_4$ are amplified by the amplifiers $501_1$ and $501_4$, respectively. After that, the amplified signals are supplied to the subtracter $502_1$ and adder $503_1$ and the arithmetic operations are started.

The subtracter $502_1$ calculates a difference between the input signals and supplies to the comparator $504_1$.

The comparator $504_1$ receives the difference signal and the first predetermined value $N_1$ and compared them. When the value of the difference signal is larger than the first predetermined value $N_1$, the comparator $504_1$ generates the scanning position deviation signal $S_1$.

The adder $503_1$ adds the input signals and supplies the addition signal to the comparator $504_2$. The comparator $504_2$ receives the addition signal and the second predetermined value $N_2$ and compares them. When those input values are almost equal, the comparator $504_2$ generates the laser intensity signal $S_2$. Since the second predetermined value $N_2$ is set so as to be equal to the addition input value when the output value of each of the photodiodes $P_1$ and $P_4$ peaks, the addition input value after the laser intensity signal $S_2$ was generated gradually decreases.

Subsequently, the outputs of the photodiodes $P_2$ and $P_5$ to which the laser beam reaches are amplified by the amplifiers $501_2$ and $501_5$ and, thereafter, the amplified signals are supplied to the adder $503_2$ and added. The addition output value of the adder $503_2$ increases together with the elapse of the scanning time and, after that, it decreases. Subsequently, the outputs of the photodiodes $P_3$ and $P_6$ to which the laser beam reaches are amplified by the amplifiers $501_3$ and $501_6$ and, thereafter, the amplified signals are supplied to the adder $503_3$ and added. The addition output value in this instance also increases together with the elapse of the scanning time and, thereafter, it decreases.

The addition outputs of the adders $503_1$ and $503_3$ are supplied to the subtracter $502_2$ and are also supplied to the adder $503_4$. When the difference of the input signals is equal to 0, the subtracter $502_2$ supplies the output holding signal $S_5$ to the sample and hold circuits $505_1$ and $505_2$ and comparator $504_3$, respectively.

The operation of each circuit when the output holding signal $S_5$ is supplied will now be described.

The sample and hold circuit $505_1$ holds the addition output value of the adder $503_2$ which is supplied (addition value of the outputs of the photodiodes $P_2$ and $P_5$) and supplies to the divider $506$. The sample and hold circuit $505_2$ holds the addition output value of the adder $503_4$ which is supplied (addition value of the outputs of the adders $503_1$ and $503_3$) and supplies to the divider $506$. The comparator $504_3$ compares the addition output value of the adder $503_2$ as the same input signal as that of the sample and hold circuit $505_1$ and the fourth predetermined value $N_4$ and generates the sync signal $S_4$ when the value of the difference between them is larger than the third predetermined value $N_3$.

The divider $506$ calculates the ratio of the holding values of the sample and hold circuits $505_1$ and $505_2$ and supplies to the comparator $504_4$. The comparator $504_4$ compares the value of the result of the division of the divider $506$ and the third predetermined value $N_3$ and generates the out-of focus signal $S_3$ when the value of the difference between them is larger than the fourth predetermined value $N_4$.

Although the above embodiment has been described with respect to the case where six photodiodes (three division sensors) are provided as a light beam receiving section, the invention can also use division sensors such that three or more photosensors are arranged in the scanning direction of the light beam so as to be symmetrical with respect to a straight line which passes the reference point and is perpendicular to the scanning direction as an axial center and at least one of the three or more photosensors is symmetrically arranged with regard to the scanning direction of the light beam. As shown in the second and third embodiments of FIGS. 7A and 7B, five ($P_{11}$ to $P_{15}$) or four ($P_{21}$ to $P_{24}$) photodiodes can be also closely arranged.

Figure 7A:
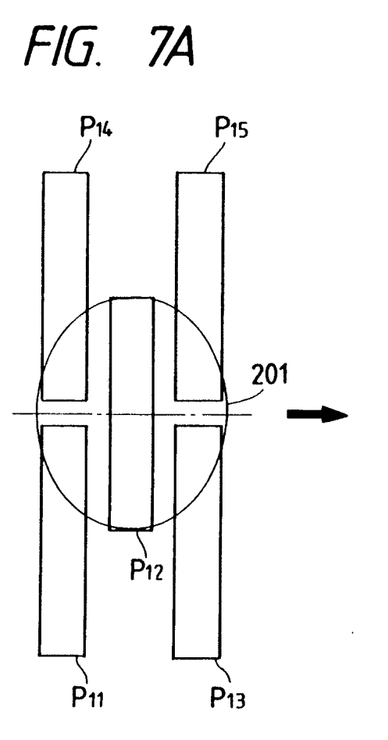
FIGS. 7A and 7B are diagrams showing constructions of light beam receiving sections which are used in the second and third embodiments of the invention, respectively.
Figure 7B:
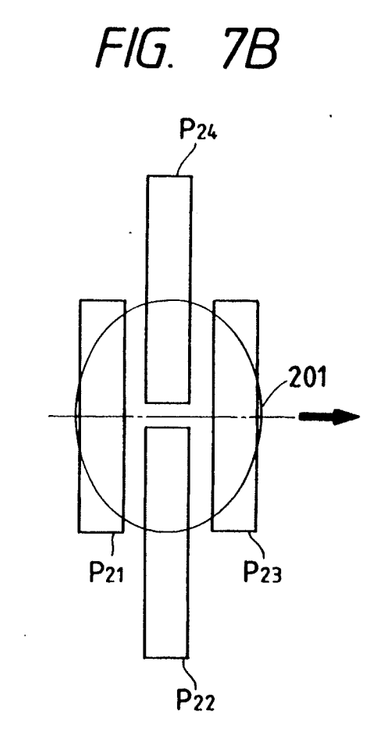
Figure 7C:
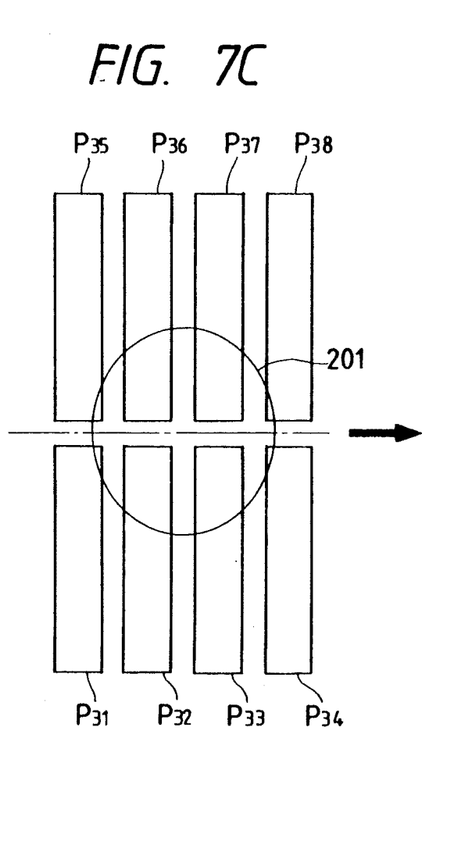
FIGS. 7C and 7D are diagrams showing constructions of light beam receiving sections which are used in the fourth and fifth embodiments of the invention, respectively.
Figure 7D:
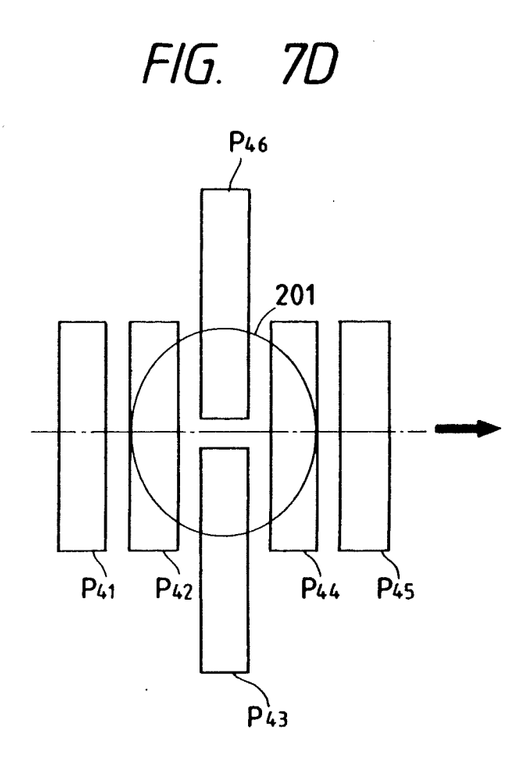

As shown in the fourth and fifth embodiments of FIGS. 7C and 7D, eight ($P_{31}$ to $P_{38}$) or six ($P_{41}$ to $P_{46}$) photodiodes can be also closely arranged.

In the second embodiment shown in FIG. 7A, the photodiodes $P_1$ and $P_4$ in the first embodiment can be replaced to the photodiodes $P_{11}$ and $P_{14}$, the central photodiodes $P_2$ and $P_5$ can be replaced to the photodiode $P_{12}$, and the photodiodes $P_3$ and $P_6$ can be replaced to the photodiodes $P_{13}$ and $P_{15}$ by merely changing the set values in the comparators, respectively.

In the third embodiment shown in FIG. 7B, the photodiodes $P_1$ and $P_4$ in the first embodiment can be replaced to the photodiode $P_{21}$, the central photodiodes $P_2$ and $P_5$ can be replaced to the photodiodes $P_{22}$ and $P_{24}$ and the photodiodes $P_3$ and $P_6$ can be replaced to the photodiode $P_{23}$ by merely changing the set values in the comparators, respectively.

In the fourth embodiment shown in FIG. 7C, the photodiodes $P_1$ and $P_4$ in the first embodiment can be replaced to the photodiodes $P_{31}$ and $P_{35}$, the central photodiodes $P_2$ and $P_5$ can be replaced to the addition of the photodiodes $P_{32}$ and $P_{33}$, the central photodiodes $P_2$ and $P_5$ can be replaced to the addition of the photodiodes $P_{36}$ and $P_{37}$, and the photodiodes $P_3$ and $P_6$ can be replaced to the photodiodes $P_{34}$ and $P_{38}$ by merely changing the set values in the comparators.

In the fifth embodiment shown in FIG. 7D, the photodiodes $P_1$ and $P_4$ in the first embodiment can be replaced to the addition of the photodiodes $P_{41}$ and $P_{42}$ the central photodiodes $P_2$ and $P_5$ can be replaced to the photodiodes $P_{43}$ and $P_{46}$, and the photodiodes $P_3$ and $P_6$ can be replaced to the addition of the photodiodes $P_{44}$ and $P_{45}$ by merely changing the set values in the comparators.

According to the invention as described above, there is provided a light beam detecting mechanism in which when a light beam scans a predetermined position as a reference point for positioning, such a scan is detected and a predetermined signal is generated in a light beam scanning apparatus to scan an object to be scanned by a light beam, wherein three or more photosensors are arranged in the scanning direction of the light beam symmetrically with respect to a straight line which passes the reference point and is perpendicular to the scanning direction as an axial center, and at least one of the three or more photosensors is division sensors which are symmetrically arranged with respect to the scanning direction of the light beam.

In the above detecting mechanism, when the absolute value of the difference between the outputs of the division sensors which are symmetrical with respect to the scanning direction of the light beam is larger than the first predetermined value, the main scanning position deviation signal indicating that the scanning position of the light beam has been deviated is generated.

On the other hand, in the above detecting mechanism, when the sum of the outputs of the division sensors which are symmetrical with respect to the scanning direction of the light beam is larger than the second predetermined value, the laser intensity signal indicating that the intensity of light beam is sufficiently large is generated.

In the above detecting mechanism, when the outputs of a pair of two photosensors locating at the symmetrical positions on both sides of the symmetrical axis (division line of the sensors) are equal and the ratio between the sum of the outputs of the pair of two photosensors and the sum of the outputs of another pair of two photosensors if such another pair of photosensors exist and/or, if another photosensor is provided at the center, the ratio between the sum of the outputs of the pair of two photosensors and the output of such a central photosensor is larger than the predetermined value corresponding to the third predetermined ratio, the out-of focus signal indicating that the focal point of the light beam is deviated is deviated is generated.

In the above detecting mechanism, when the outputs of the pair of two photosensors locating at the symmetrical positions on both sides of the symmetrical axis (division line of the sensor) are equal and the outputs of another pair of two photosensors exist and the sum of the outputs of such photosensors exceeds the fourth predetermined value and/or, if another photosensor is provided at the center, the output of such a central photosensor exceeds the predetermined value corresponding to the fourth predetermined value, the sync signal indicating that the light beam has scanned the predetermined position as a reference point for positioning is generated.

By constructing the present invention as described above, the following effects are obtained.

The sync signal can be generated at a proper timing irrespective of the output fluctuation of the light beam. The intensity fluctuation of the light beam, out-of-focus state, main scanning position deviation, and the like due to the aging changes of the apparatus and semiconductor laser device can be also detected.

Thus, an adverse influence on the image on the scanning object, reading error, or the like can be prevented. Time and costs can be reduced.

What is claimed is:

1. A scanning optical apparatus comprising:
   a light source section;
   scanning means for deflecting a light beam from said light source section and for scanning on a scanning surface; and
   detecting means for detecting the light beam which scans on the scanning surface, said detecting means including three or more photosensors closely arranged adjacent one another in the scanning direction, at least one of said photosensors being comprised by a division sensor arranged symmetrically with respect to the scanning direction.

2. An apparatus according to claim 1, wherein a state in which the scanning position of the light beam which scans on the scanning surface has been deviated is discriminated on the basis of signals which are generated from said division sensor.

3. An apparatus according to claim 1, wherein a state in which a focusing position of the light beam which scans on the scanning surface has been deviated is discriminated on the basis of signals which are generated from said division sensor.

4. An apparatus according to claim 1, wherein said detecting means is disposed so as to detect the light beam before scanning on the scanning surface.

5. An apparatus according to claim 1, wherein a synchronous signal which indicates that the light beam for scanning on the scanning surface has scanned a predetermined position which is a reference point for positioning is detected on the basis of signals generated from said division sensor.

6. An apparatus according to claim 1, wherein a state in which a focusing position of the light beam which scans on the scanning surface has been deviated is discriminated on the basic of signals generated from said detecting means.

7. An apparatus according to claim 1, wherein a synchronous signal which indicates that the light beam for scanning on the scanning surface has scanned a predetermined position which is a reference point for positioning is detected on the basis of signals generated from said detecting means.

8. An apparatus according to claim 1, wherein said three or more photosensors are arranged such that a total width thereof is set to about a diameter that is defined by $(1/e^2)$ multiplied by the central intensity of the light beam.

9. A recording apparatus comprising:
a light source section;
a recording medium;
scanning means for deflecting a light beam from said light source section and for scanning on the recording medium; and
detecting means for detecting the light beam which scans on said recording medium, said detecting means including three or more photosensors closely arranged adjacent one another in the scanning direction, at least one of said photosensors being comprised by a division sensor arranged symmetrically with respect to the scanning direction.

10. An apparatus according to claim 9, wherein a state in which the scanning position of the light beam which scans on the recording medium has been deviated is discriminated on the basis of signals which are generated from said division sensors.

11. An apparatus according to claim 9, wherein a state in which a focusing position of the light beam which scans on the recording medium has been deviated is discriminated on the basis of signals which are generated from said division sensor.

12. An apparatus according to claim 9, wherein said detecting means is disposed so as to detect the light beam before scanning on the recording medium.

13. An apparatus according to claim 9, wherein a synchronous signal which indicates that the light beam for scanning on the recording medium has scanned a predetermined position which is a reference point for positioning is detected on the basis of signals generated from said division sensor.

14. An apparatus according to claim 9, wherein a state in which a focusing position of the light beam which scans on the recording medium has been deviated is discriminated on the basis of signals generated from said detecting means.

15. An apparatus according to claim 9, wherein a synchronous signal which indicates that the light beam for scanning on the recording medium has scanned a predetermined position which is a reference point for positioning is detected on the basis of signals generated from said detecting means.

16. An apparatus according to claim 9, wherein said three or more photosensors are arranged such that a total width thereof is set to about a diameter that is defined by $(1/e^2)$ multiplied by the central intensity of the light beam.

17. A method of detecting an out-of-scanning position of a light beam in a scanning optical apparatus, comprising the steps of:
deflecting the light beam from a light source section and scanning on a scanning surface;
detecting the scanned light beam by three or more photosensors closely arranged adjacent one another in the scanning direction, at least one of said photosensors being comprised by a division sensor arranged symmetrically with respect to the scanning direction; and
discriminating that the scanning position of the light beam which scans on the scanning surface has been deviated on the basis of signals which are generated from said division sensor.

18. A method according to claim 17, further comprising the step of discriminating, on the basis of signals generated from said division sensor, a state in which a focusing position of the light beam which scans on the scanning surface has been deviated.

19. A method according to claim 17, wherein said photosensors are disposed so as to detect the light beam before scanning on the scanning surface.

20. A method according to claim 17, further comprising the step for detecting, on the basis of signals generated from said division sensor, a synchronous signal which indicates that the light beam for scanning on the scanning surface has scanned a predetermined position which is a reference point for positioning.

21. A method according to claim 17, further comprising the step of discriminating a state in which a focusing position of the light beam which scans on the scanning surface has been deviated on the basis of signals generated from said photosensors.

22. A method according to claim 17, further comprising the step of detecting, on the basis of signals generated from said photosensors, a synchronous signal which indicates that the light beam for scanning on the scanning surface has scanned a predetermined position which is a reference point for positioning.

23. A method according to claim 17, wherein said three or more photosensors are arranged such that a total width thereof is set to about a diameter that is defined by $(1/e^2)$ multiplied by the central intensity of the light beam.

* * * * *

UNITED STATES PATENT AND TRADEMARK OFFICE
CERTIFICATE OF CORRECTION

PATENT NO. : 5,331,147
DATED : July 19, 1994
INVENTOR(S) : Toshiyuki Mizuno and Yoshinobu Shiraiwa It is certified that error appears in the above-identified patent and that said Letters Patent is hereby corrected as shown below:

Claim 6, column 11, line 4, change "basic" to --basis--.

Signed and Sealed this

Tenth Day of January, 1995

Attest:

BRUCE LEHMAN

Attesting Officer     Commissioner of Patents and Trademarks